Nov. 22, 1966 G. A. MARSH 3,287,168
FUEL CELL ELECTRODE AND PREPARATION THEREOF
Filed Sept. 19, 1962
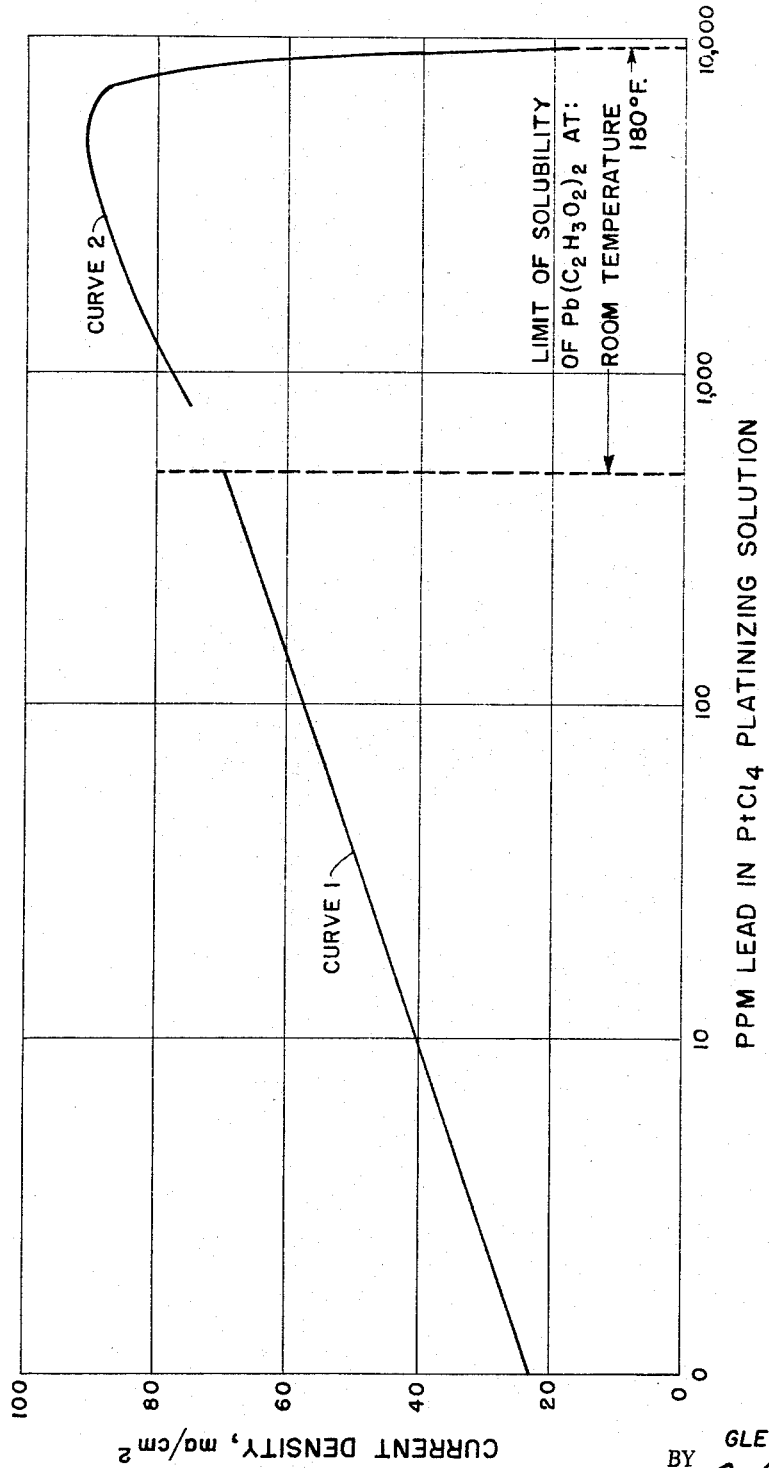
INVENTOR.
GLENN A. MARSH
BY
ATTORNEY.

United States Patent Office 3,287,168
Patented Nov. 22, 1966

3,287,168
FUEL CELL ELECTRODE AND PREPARATION THEREOF
Glenn A. Marsh, Crystal Lake, Ill., assignor, by mesne assignments, to Union Oil Company of California, Los Angeles, Calif., a corporation of California
Filed Sept. 19, 1962, Ser. No. 224,727
11 Claims. (Cl. 136—86)

This invention relates to a method of electrodepositing platinum on electrode supports, and to electrodes produced by said method. The electrodes produced in accordance with this invention are useful as primary battery electrodes, and are especially useful as fuel cell anodes.

In recent years, fuel cells have received considerable attention in the continuing quest for improved sources of electrical energy. A fuel cell is an electrochemical device in which part of the energy of a chemical reaction is converted directly into direct-current electrical energy. One of the most significant advantages of fuel cells over conventional methods of generating electricity is the directness by which chemical energy is converted into electrical energy. This direct conversion of energy eliminates the necessity of converting energy into heat, thereby avoiding the Carnot-cycle efficiency limitation. Other possible advantages of fuel cells are quietness, cleanliness, and the reduction or complete elimination of moving parts.

In general, a fuel cell electrochemically generates electricity by deriving electrical energy from a chemical reaction maintained by the continuous supply of a different reactant in effective proximity to each of two electrodes disposed in spaced relationship in an electrolyte. In the operation of a typical fuel cell utilizing an aqueous alkaline solution as the electrolyte, an oxidant is continuously introduced at the oxidant electrode (cathode) where it contacts the electrolyte and forms ions, thereby imparting positive charges to the cathode. Simultaneously, a reductant is continuously introduced at the fuel electrode (anode) where it forms ions and leaves the anode negatively charged. The ions formed at the respective electrodes migrate in the electrolyte and unite, while the electrical charges imparted to the electrode are utilized as electrical energy by connecting an external circuit across the electrodes. For example, in the case of an oxygen-hydrogen fuel cell, the hydroxyl ions that are formed at the cathode and the hydrogen ions that are formed at the anode migrate across the aqueous alkaline electrolyte and unite to form water.

A common type of electrode which has been utilized in fuel cells is a gas-diffusion electrode, which is a porous body of carbon or a metal, such as nickel, having a hollow interior through which a gaseous reactant is introduced into the electrolyte. A variety of electrodes other than gas-diffusion electrodes have been utilized in fuel cells, as, for example, the anode when the fuel (reductant) is a liquid in the electrolyte. Platinum electrodes are frequently utilized as fuel cell anodes.

A common method of preparing platinum electrodes is by platinizing a noble metal electrode support, viz., passing a D.C. electric current to a noble metal electrode support through an aqueous platinum plating solution. A conventional platinum plating solution is a solution of platinic chloride ($PtCl_4$) in hydrochloric acid; the formula being sometimes written as chloroplatinic acid ($H_2PtCl_6$). The noble metal support to be platinized is made cathodic, i.e., it is connected to the negative terminal of the D.C. source. In the classical method of platinizing (vol. 2, page 608 of Physical-Chemical Methods, by J. Riley and W. N. Rae, published 1954 by D. Van Nostrand, 5th Ave., N.Y.), 0.02–0.03% by weight of lead acetate is added to the platinum plating solution to improve the electrolysis.

This invention is based upon the discovery that improved electrodes can be prepared by utilizing a greater amount of a soluble lead salt in the electrolytic platinizing bath than is conventionally used. More specifically, I have found that the current density of a fuel cell utilizing a platinum anode is increased when a soluble lead compound is added to the bath utilized to prepare the anode in an amount such that the lead ion concentration in the bath is equal to about 0.06–0.07 times the $PtCl_4$ concentration.

Therefore, it is an object of this invention to provide improved electrodes.

Another object of this invention is to provide electrodes, which when used as anodes in fuel cells result in increased current densities of the fuel cell.

Still another object of this invention is to provide a method of preparing improved electrodes.

A further object of this invention is to provide a method of preparing improved platinum electrodes by incorporating in the electrolytic platinizing bath a critical amount of a soluble lead compound.

A still further object of this invention is to provide a fuel cell utilizing a platinum electrode prepared in accordance with this invention.

A still further object of this invention is to provide an electrolytic platinizing bath which can be used to prepare improved electrodes.

These and further objects of this invention will be described or become apparent as the description herein proceeds.

In accordance with this invention, the prior art practice of making platinum electrodes by passing a direct electric current to a noble metal electrode support through an aqueous electrolytic platinizing bath is modified by increasing the amount of the lead compound which is added to the bath, such that the bath contains a lead ion concentration of about 0.01–0.08, preferably about 0.06–0.07, times the platinic chloride concentration. For example, when the platinum plating bath contains 10% by weight of $PtCl_4$, in addition to HCl, the lead ion concentration is preferably in the range from about 0.6–0.7% by weight.

The lead is added to the platinizing bath in the form of any convenient acid-soluble compound of lead, e.g., the nitrate or acetate, so that it is soluble in the bath. The temperature of the platinizing solution may be any value at which the lead compound is soluble to the desired extent. For example, the solubility of lead acetate in a bath containing 10% by weight of $PtCl_4$ and 20% by weight of HCl, is such that the maximum lead ion concentration is only about 0.05% by weight at room temperature, but about 0.95% by weight at 180° F.

As hereinbefore disclosed, a conventional platinizing solution which can be modified in accordance with this invention to prepare improved electrodes comprises a solution of platinic chloride in hydrochloric acid. Electrolytic baths containing platinic chloride at concentrations within the range of about 1 to 30% by weight are suitable, but a concentration of about 10% by weight is preferred. Hydrochloric acid is added to the bath in such an amount that the mol ratio of hydrochloric acid to platinic chloride in the bath is at least 1:1. The preferred mol ratio of hydrochloric acid to platinic chloride is about 2:1. An increase in the mol ratio of hydrochloric acid to platinic chloride in the bath will result in a decrease in the current efficiency, thereby requiring a longer period of time to deposit the desired amount of platinum on the noble metal support.

The platinizing bath is electrolyzed at a current density of about 50 to 125 milliamperes per square centimeter of surface of the noble metal support. The preferred current density is about 75 milliamperes per square centimeter. Current densities below about 50 ma./cm.² tend to render the plating too smooth to have the high surface area and catalytic property needed, while current densities above 125 ma./cm.$^2$ are equally unsatisfactory since they result in deposits which are flocculent and fragile. The current is periodically reversed during the platinizing, about every 30 seconds for example, in order to anodically dissolve any lead that is plated out. A satisfactory electrode is obtained by electrolyzing the bath at the disclosed range of current density for about 10 to 40 minutes.

Since the electrode contains entrapped chloride ions, which are a poison for the catalytic surface, the electrode is preferably treated following the platinizing by utilizing it to electrolyze a dilute non-halogen-containing acid to free it of the entrapped chloride ions, as well as to purge the platinum coating, in accordance with the prior art practice. Illustrative of such a treatment, the electrode is used to electrolyze dilute sulfuric acid both anodically and then cathodically, for 1 to 10 minutes in each direction, at a current density of about 50 to 125 milliamperes per square centimeter.

In order to demonstrate the improved electrodes of this invention, electrodes were prepared by the hereinbefore described conventional method of passing a direct electric current to a platinum electrode support through an aqueous platinum plating solution, containing 10% by weight of platinic chloride, at a current density of 75 milliamperes per square centimeter of the electrode support for 15 minutes. In each run, the concentration of hydrochloric acid in the plating bath was maintained constant so that the mol ratio of hydrochloric acid to platinic chloride was 2:1, but the amount of lead, added as lead acetate, was varied. The support was initially connected to the negative terminal of the D.C. source and the current was reversed every 30 seconds. At the conclusion of the platinizing, the electrodes were used to electrolyze a one molar solution of sulfuric acid, first in the anodic direction and then in the cathodic direction, for 5 minutes in each direction at a current density of 50 milliamperes per square centimeter, to remove chloride ions, which adversely affect the catalytic ability of the electrodes.

The platinized electrodes thus prepared and treated were then individually tested as anodes in an acidic methanol fuel cell. The fuel cell was measured in the conventional manner against a saturated calomel electrode. Each of the electrodes was disposed in an electrolyte comprising a mixture of methanol and sulfuric acid in the ratio of 3 mols of methanol to 1 mol of sulfuric acid per liter of solution. Also disposed in the electrolyte were an inert cathode spaced from the anode prepared in accordance with this invention, and a conventional saturated calomel electrode adjacent to the anode. The tip of the calomel electrode was touching the anode. A high resistance voltmeter was inserted in the circuit between the calomel electrode and the test electrode. A battery and a variable resistance were inserted between the test electrode and the inert cathode to adjust the current between the anode and cathode. In making the tests, the variable resistance was adjusted to bring about a potential of 0.4 volt between the anode and the saturated calomel electrode, the anode being positive in polarity.

The accompanying drawing is a graphical representation of the current densities obtained, in milliamperes per square centimeter of anode, by varying the amount of lead acetate added to the platinizing bath. Table I, which is a tabular summary of Curve 1, indicates the current densities obtained when the platinizing was carried out at room temperature. A maximum lead ion concentration of 0.05% by weight was used in this series of experiments since this represents approximately the maximum solubility of lead acetate in the 10% platinic chloride solution at room temperature.

TABLE I.—PLATINIZED AT ROOM TEMPERATURES

| Electrode Number | Pb Conc., p.p.m., Added as Pb (C$_2$H$_3$O$_2$)$_2$ | Average Current Output of Resulting Electrode |
|---|---|---|
| 1 | 0 | 23 |
| 2 | 10 | 40 |
| 3 | 30 | 46 |
| 4 | 100 | 55 |
| 5 | 300 | 65 |
| 6 | 500 | 70 |

In the series of experiments depicted by Curve 2 of the accompanying drawing, the platinizing was carried out at 180° F. in order to achieve a greater solubility of lead acetate in the plating bath. At this temperature, the maximum solubility of lead was 9,500 parts per million (0.95% lead or 1.7% lead acetate). Table II contains a tabular summary of Curve 2.

TABLE II.—PLATINIZED AT 180° F.

| Electrode Number | Pb Conc., p.p.m., Added as Pb (C$_2$H$_3$O$_2$)$_2$ | Average Current Output of Resulting Electrode |
|---|---|---|
| 7 | 500 | 62 |
| 8 | 1,000 | 76 |
| 9 | 4,000 | 87 |
| 10 | 6,000 | 90 |
| 11 | 7,000 | 90 |
| 12 | 8,000 | 80 |
| 13 | 9,000 | 58 |
| 14 | 9,500 | 12 |

From Curve 2 and Table II, it can be seen that the current output is substantially higher when the platinizing bath contains from about 1000 to 8000 p.p.m. of lead, than when it contains the conventional amount of lead, with the maximum improvement occurring when the bath contained from about 6000 to 7000 p.p.m.

As a typical embodiment of a fuel cell using an anode prepared in accordance with the instant invention, a hollow Raney nickel cathode and an anode, which is the same as electrode No. 11 of Table II, are disposed in spaced relationship in an electrolyte. The electrolyte is a mixture of methanol and sulfuric acid in the ratio of 1 mol of methanol to 1 mol of a 52% aqueous solution of sulfuric acid, which is contained in a suitable glass housing. An oxygen-containing gas, such as air, is introduced into the electrolyte through the hollow interior of the cathode. An electrically operated or an electrically energized device is then connected in an external circuit across the anode and cathode.

The embodiments of the invention in which an exclusive property or privilege is claimed are defined as follows:

1. A method of preparing electrodes comprising passing a direct electric current from an anode to a cathodic noble metal electrode support through an aqueous platinum plating solution consisting essentially of platinic chloride, hydrochloric acid, and a lead compound soluble in the solution, said lead compound being present in an amount to provide a lead ion concentration of about 0.06–0.07 times the concentration of platinic chloride in said plating solution, maintaining the temperature of said plating solution sufficiently high to assure solubility of said lead compound, and maintaining the current density between about 50–125 milliamperes per square centimeter of said support.

2. A method in accordance with claim 1 in which said plating solution contains 1–30% by weight of platinic chloride and the mol ratio of hydrochloric acid to platinic chloride in said plating solution is at least 1:1.

3. A method in accordance with claim 2 in which said soluble lead compound is selected from the group consisting of lead acetate and lead nitrate.

4. A method in accordance with claim 3 in which the mol ratio of hydrochloric acid to platinic chloride is about 2:1.

5. A method in accordance with claim 4 in which the current density is maintained at about 75 milliamperes per square centimeter.

6. A method in accordance with claim 5 in which the electric current is reversed about every 30 seconds.

7. A method in which the electrode prepared in accordance with claim 6 is treated by being utilized to electrolyze a dilute aqueous solution of a non-halogen-containing mineral acid.

8. An electrode produced by passing a direct electric current to a noble metal support through an aqueous platinum plating solution consisting essentially of hydrochloric acid, platinic chloride, and lead ions in an amount of about 0.06–0.07 times the concentration of platinic chloride, said lead ions resulting from the presence in said solution of a soluble lead compound, said electric current being maintained at a current density between about 50–125 milliamperes per square centimeter of said support, and the temperature of said plating solution being maintained sufficiently high to insure solubility of said lead compound.

9. In a fuel cell comprising an electrolyte containing a reductant and two electrodes disposed therein in spaced relationship, and means for introducing a free oxygen-containing gas in said electrolyte in effective proximity to one of said electrodes, the improvement wherein the second electrode is the electrode of claim 8.

10. A bath for the electrolytic deposition of platinum consisting essentially of an aqueous solution of platinic chloride, hydrochloric acid, and at least one soluble lead compound in an amount to provide a lead ion concentration of about 0.06–0.07 times the concentration of platinic chloride.

11. A bath in accordance with claim 10 in which the mol ratio of hydrochloric acid to platinic chloride is at least 1:1.

References Cited by the Examiner

Riley, J., et al.: "Physico-Chemical Methods," vol. 2, pp. 608–609, 1954.

JOHN H. MACK, *Primary Examiner.*

G. KAPLAN, *Assistant Examiner.*